United States Patent
Suzuki et al.

(10) Patent No.: US 11,390,936 B2
(45) Date of Patent: Jul. 19, 2022

(54) SPRING STEEL

(71) Applicant: NIPPON STEEL & SUMITOMO METAL CORPORATION, Tokyo (JP)

(72) Inventors: Takahisa Suzuki, Tokyo (JP); Suguru Yoshida, Tokyo (JP); Yutaka Neishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 336 days.

(21) Appl. No.: 16/071,854

(22) PCT Filed: Jan. 26, 2017

(86) PCT No.: PCT/JP2017/002687
§ 371 (c)(1),
(2) Date: Jul. 20, 2018

(87) PCT Pub. No.: WO2017/131077
PCT Pub. Date: Aug. 3, 2017

(65) Prior Publication Data
US 2019/0032177 A1 Jan. 31, 2019

(30) Foreign Application Priority Data
Jan. 26, 2016 (JP) .................. 2016-012427

(51) Int. Cl.
| | |
|---|---|
| *C22C 38/54* | (2006.01) |
| *C22C 38/34* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |

(52) U.S. Cl.
CPC ............ *C22C 38/54* (2013.01); *C22C 38/001* (2013.01); *C22C 38/002* (2013.01); *C22C 38/02* (2013.01); *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01)

(58) Field of Classification Search
CPC ...................................................... C22C 38/00
See application file for complete search history.

(56) References Cited

U.S. PATENT DOCUMENTS

| | | | |
|---|---|---|---|
| 6,406,565 B1 * | 6/2002 | Hashimura | ............ C22C 38/26 |
| | | | 148/333 |
| 7,789,974 B2 | 9/2010 | Hashimura | |
| 10,724,125 B2 * | 7/2020 | Suzuki | ................. C22C 38/001 |
| 2007/0095439 A1 | 5/2007 | Yoshihara | |
| 2010/0034691 A1 | 2/2010 | Yoshihara | |
| 2017/0058376 A1 | 3/2017 | Takeda et al. | |
| 2018/0142333 A1 | 5/2018 | Suzuki et al. | |

FOREIGN PATENT DOCUMENTS

| | | |
|---|---|---|
| EP | 0 943 697 A1 | 9/1999 |
| EP | 1801253 A1 | 6/2007 |
| JP | 2839900 B2 | 12/1998 |
| JP | 2001-49337 A | 2/2001 |
| JP | 2001131684 A * | 5/2001 |
| JP | 3577411 B2 | 10/2004 |
| JP | 2007-126700 A | 5/2007 |
| JP | 2014-162949 A | 9/2014 |
| JP | 2014162949 A * | 9/2014 ............ C22C 38/00 |
| WO | WO 98/51834 A1 | 11/1998 |
| WO | WO 2008/053884 A1 | 5/2008 |
| WO | WO 2015/129403 A1 | 9/2015 |
| WO | WO 2016/186033 A1 | 11/2016 |
| WO | WO-2016186033 A1 * | 11/2016 ............ C22C 38/54 |

OTHER PUBLICATIONS

Suguru, JP-2014162949-A—machine-generated English language text (Year: 2020).*
JPlat-Pat Machine Translation of JP 2001-131684 (Year: 2021).*
International Search Report for PCT/JP2017/002687 dated May 9, 2017.
Written Opinion of the International Searching Authority for PCT/JP2017/002687 (PCT/ISA/237) dated May 9, 2017.
Extended European Search Report for European Application No. 17744307.4, dated Jul. 3, 2019.

* cited by examiner

*Primary Examiner* — Alexandra M Moore
(74) *Attorney, Agent, or Firm* — Birch, Stewart, Kolasch & Birch, LLP

(57) ABSTRACT

There is provided a spring steel including predetermined chemical composition, in which ([Ti mass %]−3.43×[N mass %])/[S mass %]>4.0, and [Ni mass %]+[Cu mass %]<0.75 are satisfied, and an appearance frequency of MnS is less than 20% among inclusions having an equivalent circle diameter of 1 μm or more which are observed at a ¼ position of a diameter from a surface.

3 Claims, No Drawings

SPRING STEEL

TECHNICAL FIELD OF THE INVENTION

The present invention relates to spring steel and relates to a spring steel suitable for a suspension spring having high strength, high toughness, and high corrosion resistance after quenching and tempering.

Priority is claimed based on Japanese Patent Application No. 2016-012427 filed in Japan on Jan. 26, 2016, the contents of which are incorporated herein by reference.

RELATED ART

In addition to developments in terms of high performance and weight reduction of automobiles, springs used for vehicle components are also high-strengthened. Due to the high-strengthening of the spring, high strength steels having tensile strength of higher than 1,800 MPa after heat treatments have been provided for manufacturing of the spring. Recently, steels having tensile strength of higher than 2,000 MPa have begun to be used as a spring material.

On the other hand, suspension springs of automobiles require high toughness to resist damage from impact loads caused by unevenness of road surfaces and the like in addition to high strength.

With respect to the high strength spring steel, it is known that, in a case where a corrosion pit is generated due to corrosion or hydrogen is penetrated from the surrounding environment, fatigue properties extremely decrease due to the stress concentration to a pit portion or the hydrogen embrittlement. Therefore, the spring steel requires corrosion resistance and corrosion fatigue properties in the environment of being exposed to rainwater or the like.

Recently, methods for achieving both of the high strength and the above properties have been proposed.

For example, in Patent Document 1, both of the high strength and the high toughness of steel are achieved by refining the grain size of a prior austenite grain whose grain boundary serves as a starting point of brittle fracture. Control of the prior austenite grain size is performed by using nitride, carbide, and carbonitride of Ti obtained by the addition of Ti.

In Patent Document 2, the embrittlement due to the hydrogen penetration and the decrease in the fatigue properties are suppressed by trapping hydrogen to Ti precipitates.

In Patent Document 3, the embrittlement caused by hydrogen penetration is suppressed by improving corrosion resistance of steel with adding a large amount of Ni.

However, in Patent Document 1, a countermeasure with respect to MnS inclusion as a starting point of corrosion is not performed. Therefore, corrosion resistance is not sufficient. Also in Patent Document 2, although a countermeasure with respect to hydrogen penetration after corrosion has been reviewed, a countermeasure with respect to MnS inclusion as a starting point of corrosion is not performed. Since Ti is an element that causes embrittlement of a steel, even when nitride, carbide, and carbonitride of Ti is formed as in Patent Document 2, it is required to suppress the adding amount of Ti, or to add a large amount of an expensive alloying element such as Ni (for example, Ni: 0.5 mass % or more) in order to improve toughness, in a case where Ti is added in a certain amount or more. Also in Patent Document 3, although it is required to add a large amount of Ni in order to improve corrosion resistance, the addition of a large amount of Ni leads to increase in the cost of a raw material and deteriorate the manufacturability caused by increasing a risk of hot cracking during manufacturing steel.

PRIOR ART DOCUMENT

Patent Document

[Patent Document 1] Japanese Patent No. 3577411
[Patent Document 2] Japanese Unexamined Patent Application, First Publication No. 2001-49337
[Patent Document 3] Japanese Patent No. 2839900

DISCLOSURE OF THE INVENTION

Problems to be Solved by the Invention

An object of the present invention is to provide a spring steel having tensile strength of 1,800 MPa or more, high toughness, and high corrosion resistance after a heat treatment of quenching and tempering and the like.

Means for Solving the Problem

The present invention is summarized in the following steel.

(1) A spring steel according to an aspect of the present invention including, as a chemical composition, by mass %: C: 0.40% to 0.60%; Si: 0.90% to 3.00%; Mn: 0.10% to 0.60%; Cr: 0.10% to 1.00%; Al: 0.010% or more and less than 0.050%; Ti: 0.040% to 0.100%; B: 0.0010% to 0.0060%; N: 0.0010% to 0.0070%; V: 0% to 1.00%; Mo: 0% to 1.00%; Ni: 0% or more and less than 0.45%; Cu: 0% to 0.50%; Nb: 0% to 0.10%; P: limited to less than 0.020%; and S: limited to less than 0.020%, a remainder including Fe and impurities, wherein Expressions 1 and 2 are satisfied, and an appearance frequency of MnS is less than 20% among inclusions having an equivalent circle diameter of 1 μm or more which are observed at a ¼ position of a diameter from a surface.

$$([\text{Ti mass \%}] - 3.43 \times [\text{N mass \%}])/[\text{S mass \%}] > 4.0 \qquad \text{Expression 1}$$

$$[\text{Ni mass \%}] + [\text{Cu mass \%}] < 0.75 \qquad \text{Expression 2}$$

here, [Ni mass %], [Cu mass %], [Ti mass %], [N mass %], and [S mass %] in Expressions 1 and 2 respectively represent a Ni content, a Cu content, a Ti content, a N content, and a S content in unit mass %.

(2) The spring steel according to (1) may include, as the chemical composition, by mass %, one or more selected from the group consisting of: V: 0.05% to 1.00%, Mo: 0.10% to 1.00%, Ni: 0.05% or more and less than 0.45%, Cu: 0.05% to 0.50%, and Nb: 0.01% to 0.10%.

Effects of the Invention

According to the present invention, without decreasing manufacturability, it is possible to provide a spring steel having the tensile strength of 1,800 MPa or more, the high toughness, and the high corrosion resistance after the heat treatment such as quenching and tempering.

The spring steel according to the present invention has high strength, high toughness, and high corrosion resistance after quenching and tempering, and thus preferably used in suspension spring or the like.

Embodiments of the Invention

The present inventors have reviewed a method of obtaining a spring steel having the sufficient toughness and the sufficient corrosion resistance after quenching and tempering, even if the strength is high.

As a result, the present inventors have found that the decrease of a Mn content is effective for obtaining a spring steel having the sufficient toughness after quenching and tempering. However, generally, Mn is an alloying element that contained in order to detoxify S in steel, which provides adverse effect on the toughness or the like, by fixing S as MnS. Therefore, in order to decrease the Mn content, an element that fixes S instead of Mn is required.

The present inventors have focused on Ti as an element for fixing S instead of Mn and have found that S can be fixed to be detoxified by controlling Ti content, N content and S content in steel to satisfy a predetermined relationship, even when the Mn content is decreased. Generally, although it is considered that Ti is an element to embrittle steel, the present inventors have found that this object can be achieved by controlling N content together with Ti so as to refine the prior austenite grain size and simultaneously containing B which strengthens the grain boundary.

In relation to the corrosion resistance, it is known that MnS in the steel is dissolved in a case of contacting with water and forms a local cell so as to promote the generation of rust and corrosion pits. In contrast to this, Ti-based sulfide such as $Ti_4C_2S_2$ is stable with respect to water, and thus the corrosion resistance of the steel according to the present invention can be increased.

Therefore, as described above, it has been found that corrosion resistance can also improved in addition to the strength and the toughness by decreasing the Mn content, controlling the Ti content so as to satisfy the relationship of the N content and the S content and containing a predetermined amount of B. As described above, when the amounts of the elements are respectively controlled, it is possible to suppress the content such as Cu or Ni, and thus the properties can be secured without deteriorating the manufacturability and the cost.

In this manner, the present inventors have newly found that it is possible to obtain a spring steel having high toughness and high corrosion resistance with keeping high tensile strength after quenching and tempering by utilizing the improvement in toughness obtained by the decrease of Mn, the detoxification of S and the improvement in corrosion resistance obtained by the control of the Ti, N, and S contents, and the grain boundary strengthening obtained by B, in a combined manner. Since a small amount of Ti is contained, the corrosion resistance is improved, and thus the amount of expensive Ni used for increase the corrosion resistance can be suppressed.

Hereinafter, the spring steel (spring steel according to the present embodiment) according to an embodiment of the present invention based on this knowledge is described.

The reason for limiting the elements (the chemical composition) of the spring steel according to the present embodiment are described.

[C: 0.40% to 0.60%]

C is an element that greatly gives the influence on the strength of the steel. In order to provide sufficient strength to the steel after quenching and tempering, the lower limit of the C content is set to 0.40%. The preferable lower limit of the C content is 0.42%, and the more preferable lower limit is 0.45%. On the other hand, in a case where the C content is excessive, untransformed austenite (residual austenite) is increased in the steel after quenching, and the effect of C for increasing the strength is decreased. In addition, the toughness is significantly decreased. Accordingly, the upper limit of the C content is set to 0.60%. The preferable upper limit of the C content is 0.58%.

[Si: 0.90% to 3.00%]

Si is an element for increasing the strength of the spring manufactured from the spring steel. In addition, Si is an element for improving resistance to settling (settling resistance), which is the shape change during use of the spring. In order to obtain these effects, in the spring steel according to the present embodiment, the lower limit of the Si content is set to 0.90%. The preferable lower limit of the Si content is 1.20% and the more preferable lower limit is 1.40%. On the other hand, in a case where the Si content is excessive, the steel is significantly embrittled. Accordingly, the upper limit of the Si content is set to 3.00%. The preferable upper limit of the Si content is 2.50%.

[Mn: 0.10% to 0.60%]

Mn is an element for improving hardenability of the steel and improving the strength of the steel after quenching. In order to obtain these effects, in the spring steel according to the present embodiment, the lower limit of the Mn content is set to 0.10%. The preferable lower limit of the Mn content is 0.20% and the more preferable lower limit is 0.25%. On the other hand, Mn is an element that reacts with S in the steel and forms MnS, and in a case where the Mn content is excessive, coarse MnS is formed. In the related art, in order to fix S as MnS, a large amount of Mn is contained. However, MnS becomes a starting point of the corrosion and causes rusting or a corrosion pit generated as a result of rusting. Since this corrosion pit becomes a starting point of the fatigue fracture, in the spring steel according to the present embodiment, in order to suppress the forming of MnS, the upper limit of the Mn content is set to 0.60%. The preferable upper limit of the Mn content is 0.50%.

[Cr: 0.10% to 1.00%]

Cr is an essential element for securing the strength of the steel after quenching and tempering by improving the hardenability of the steel and also controlling a precipitation state of carbide. In order to obtain such an effect, in the spring steel according to the present embodiment, the lower limit of the Cr content is set to 0.10%. The preferable lower limit of the Cr content is 0.25%. On the other hand, in a case where the Cr content is excessive, the steel after quenching and tempering is embrittled. Accordingly, the upper limit of the Cr content is set to 1.00%. The preferable upper limit of the Cr content is 0.90%.

[Ti: 0.040% to 0.100%]

Ti improves the strength of the steel and is an element having a function for detoxifying S by reacting with S in the steel so as to fix S as Ti-based sulfide (TiS and/or $Ti_4C_2S_2$). In addition, Ti has an effect for fixing N in the steel as TiN by bonding to N. Since the effect for fixing N is necessary in order to obtain the effect of the solid solution B described later, it is necessary for containing a sufficient amount of Ti for fixing N. In order to obtain these effects, in the spring steel according to the present embodiment, the lower limit of the Ti content is set to 0.040%. The preferable lower limit of the Ti content is 0.045% and the more preferable lower limit is 0.050%. On the other hand, the excessive Ti generates coarse TiN that easily becomes a starting point of a fracture and embrittles the steel itself. Therefore, the upper limit of the Ti content is set to 0.100%. The preferable upper limit of the Ti content is 0.080%.

[Al: 0.010% or more and less than 0.050%]

Al is an element used as a deoxidizing element, has an effect for fixing excessive N as AN, and thus is an element useful for controlling an O content and an N content of steel.

Since Al has stronger deoxidation force than Ti, in order to use Ti as nitride and/or sulfide as described above, it is necessary to sufficiently perform deoxidation by adding Al before adding Ti, during manufacturing steel.

In order to obtain these effects, the lower limit of the Al content is set to 0.010%. In a case where the Al content is less than 0.010%, sufficient Ti-based sulfide cannot be obtained, and MnS is increased. The preferable lower limit of the Al content is 0.015%, and the more preferable lower limit of the Al content is 0.020%. On the other hand, since the excessive Al causes the generation of the coarse inclusion, the fracture properties are deteriorated. Accordingly, in order not to cause the adverse influence to be significant, in the spring steel according to the present embodiment, the Al content is set to less than 0.050%. The preferable upper limit of the Al content 0.040%.

Although Si is also a deoxidizing element, since the deoxidation effect is lower than Ti, the above effect cannot be obtained in a case of Si. Accordingly, it is required that the Al content is controlled within the range described above.

[B: 0.0010% to 0.0060%]

B is an element having an effect for improving the hardenability of the steel. In addition, B suppresses segregation of P, S, and the like to a grain boundary by preferentially segregating to a prior austenite grain boundary where easily becomes a starting point of the fracture, as the result, B is an element for contributing to the increase of the grain boundary strength and the improvement of the toughness. Although the above described Ti is an element that is concerned to embrittle the spring steel, B is simultaneously contained, so that the embrittlement by Ti can be suppressed by the effect of B for improving the toughness. However, in order to obtain these effects, the generation of BN has to be suppressed, and it is required to increase an amount of B in a solid soluble state. In order to obtain an effect for improving the hardenability and an effect for improving the grain boundary strength, in the spring steel according to the present embodiment, the lower limit of the B content is set to 0.0010%. The preferable lower limit of the B content is 0.0015% and the more preferable lower limit is 0.0020%. On the other hand, even in a case where B is excessively contained, it is concerned that these effects are saturated, and also the toughness of the steel is decreased. Accordingly, the upper limit of the B content is set to 0.0060%. The preferable upper limit of the B content is 0.0050% and the more preferable upper limit is 0.0040%.

[N: 0.0010% to 0.0070%]

N is an element for generating various kinds of nitride in the steel. The nitride particle that is stable even in the high temperature exhibits an effect for refining a prior austenite grain due to a pinning effect of the austenite grain growth. In the spring steel according to the present embodiment, the lower limit of the N content is set to 0.0010% in order to refine the prior austenite grain of the steel after quenching and tempering by precipitating TiN particle, which is the very stable, in the steel before quenching and tempering. The preferable lower limit of the N content is 0.0020%. On the other hand, in a case where the N content is excessive, the TiN particle becomes coarse and becomes a starting point of the fracture, and thus the toughness and the fatigue properties decrease. In a case where the N content becomes excessive, N bonds to B so as to form BN, and an amount of the solid solution B is decreased. In a case where the amount of the solid solution B is decreased, it is concerned that the effect of B for improving the hardenability and the effect for improving the grain boundary strength, which are obtained by the above described, may be deteriorated. Accordingly, the upper limit of the N content is set to 0.0070%. The preferable upper limit of the N content is 0.0060%.

[P: less than 0.020%]

P is in the steel as an impurity element and an element for embrittlement of the steel. Particularly, P that is segregated to the prior austenite grain boundary decreases the grain boundary strength, and the embrittlement of the steel is caused. Therefore, it is preferable that the P content is smaller. In order to prevent the embrittlement of the steel, in the spring steel according to the present embodiment, the P content is limited to be less than 0.020%. The preferable upper limit of the P content is 0.015%.

[S: less than 0.020%]

S is in the steel as the impurity element and an element for embrittlement of the steel in the same manner as in P. Although the Mn is contained so that S can be fixed as MnS, in a case where MnS becomes coarse, MnS functions as a starting point of the fracture and deteriorates fracture properties of the steel. In order to suppress these adverse effects, it is preferable that the S content is small, and in the spring steel according to the present embodiment, the S content is limited to less than 0.020%. The preferable upper limit of the S content is 0.015% and the more preferable upper limit is 0.010%.

The spring steel according to the present embodiment basically includes the above elements, and the remainder consists of Fe and impurities. However, instead of a part of Fe, one or more selected from the group consisting of Ni, Mo, V, Cu, and Nb may be contained in the ranges described below. Here, Ni, Mo, V, Cu, and Nb are optional elements, and the steel according to the present embodiment may not contain these elements as the chemical composition. Accordingly, the lower limits of the respective amounts of Ni, Mo, V, Cu, and Nb are 0%.

An impurity is an element that is contaminated from a raw material such as ores or scraps during manufacturing steel in an industrial scale or from various environments of a manufacturing step and means that is acceptable in a range of not giving an adverse effect on the steel.

[Ni: 0% or more and less than 0.45%]

Ni is an element for improving the hardenability of the steel. Ni is an element for improving the corrosion resistance of the steel and is an element that contributes to suppressing for the embrittlement of the steel by suppressing the hydrogen penetration under the corrosion environment. In order to obtain these effects, in the spring steel according to the present embodiment, the Ni content may be 0.05% or more. On the other hand, in a case where the Ni content is 0.45% or more, the hot ductility of the steel is decreased, and thus manufacturability significantly is decreased. Therefore, in a case where Ni is contained, the Ni content is set to less than 0.45%. The preferable upper limit of the Ni content is 0.40%.

[Mo: 0% to 1.00%]

Mo is an element having the effect for increasing the strength of the steel after quenching and tempering, by improving hardenability of the steel and also suppressing tempering softening. In order to obtain the effect, the Mo content may be 0.10% or more. On the other hand, in a case where the Mo content is greater than 1.00%, this effect is saturated. Since Mo is an expensive element and it is not preferable to be contained in a required amount or more, in a case where Mo is contained, it is preferable that the upper limit of the Mo content is set to 1.00%. The more preferable upper limit of the Mo content is 0.60%.

[V: 0% to 1.00%]

V is an element having an effect for increasing the strength of the steel after quenching and tempering, by improving the hardenability and suppressing tempering softening. In order to obtain this effect, the V content may be 0.05% or more. On the other hand, in a case where the V content is greater than 1.00%, coarse precipitates, which are not solid solubilized, are generated, and thus the steel is embrittled. Accordingly, in a case where V is contained, the upper limit of the V content is set to 1.00%. The preferable upper limit of the V content is 0.50%.

[Cu: 0% to 0.50%]

Cu has an effect for suppressing the decarburization during hot rolling and an effect for improving the corrosion resistance in the same manner as in Ni. In order to obtain these effects, the Cu content may be 0.05% or more. On the other hand, Cu decreases hot ductility of the steel and it is concerned that Cu causes generating cracks during hot rolling. On the other hand, in a case where Cu is contained, the upper limit of the Cu content is set to 0.50%. The preferable upper limit of the Cu content is 0.30%.

[Nb: 0% to 0.10%]

Nb is an element that precipitates nitride particle and carbide particle and refines the prior austenite grain after quenching and tempering by the pinning effect of the austenite grain growth. In order to obtain these effects, the Nb content may be 0.01% or more. On the other hand, in a case where the Nb content is greater than 0.10%, the coarse precipitates, which are not solid solubilized, are generated, and the steel is embrittled. Accordingly, even in a case where Nb is contained, the upper limit of the Nb content is set to 0.10%. The preferable upper limit of the Nb content is 0.06%.

As described above, the spring steel according to the present embodiment includes both of the case where the essential elements are included and the remainder consists of Fe and impurities and the case where the essential elements are included, one or more of optional elements is included and the remainder consists of Fe and impurities are acceptable.

With respect to the spring steel according to the present embodiment, in addition to the respective amounts of the elements, it is required that Ti, N, S, Cu, and Ni satisfy the following relationship.

$$([Ti\ mass\ \%]-3.43\times[N\ mass\ \%])/[S\ mass\ \%]>4.0$$

In the spring steel according to the present embodiment, as described above, the Mn content is decreased by using Ti for the fixation of S. Therefore, with respect to the spring steel according to the present embodiment, in order to secure a sufficient amount of Ti required for fixing S, it is required that the chemical composition satisfy Expression 1.

$$([Ti\ mass\ \%]-3.43\times[N\ mass\ \%])/[S\ mass\ \%]>4.0 \quad \text{(Expression 1)}$$

Here, [Ti mass %], [N mass %], and [S mass %] in Expression 1 respectively represent the Ti content, the N content, and the S content (mass %) in the steel.

With respect to bonding energy to Ti, N is stronger than S. Therefore, Ti in the steel first bonds to N so as to form TiN, and residual Ti becomes sulfide. In Expression 1, the numerical value "3.43" of the numerator on the left side is a value obtained by dividing the atomic weight of Ti by the atomic weight of N. "3.43×[N mass %]" is a maximum amount of Ti that can be consumed by the forming of TiN. The left side of Expression 1 is a ratio of a "remaining content of Ti without being consumed by N" and a "S content". In a case where $Ti_4C_2S_2$ is assumed as Ti-based sulfide, a mass ratio of Ti and S satisfies Ti:S=3:1 from molecular formulae and each of atomic weights, and thus in order to cause "remaining Ti without being consumed by N to be sufficient for fixing S as $Ti_4C_2S_2$", it is required that the left side of Expression 1 is 4.0 or more and is preferably greater than 4.5. In a case where the left side of Expression 1 is less than 4.0, Ti may not sufficiently fix S, and as a result, a large amount of MnS is generated.

In the spring steel according to the present embodiment, since Ti is fixed with S, and thus the generation of MnS is suppressed. Since MnS becomes a starting point of the corrosion, the generation of MnS are suppressed so that the generation of rusting and a corrosion pit occurred by rusting can be suppressed.

[Ni mass %]+[Cu mass %]<0.75

In the related art, the corrosion resistance has been improved by containing Cu and Ni. However, in a case where large amounts of Ni and Cu are contained, there are problems in that the risk of hot cracks during manufacturing is increased, and manufacturability is decreased. In the spring steel according to the present embodiment, since the corrosion resistance is improved by suppressing the generation of MnS, it is possible to decrease the Ni content and the Cu content which are elements for improving the corrosion resistance. Due to the decreases in the Ni content and the Cu content, the countermeasure with respect to the hot cracks can be reduced, and thus the improvement in the manufacturability and the suppression of the manufacturing cost are achieved.

The spring steel according to the present embodiment satisfies the following expression in order to sufficiently secure all of the corrosion resistance, the manufacturability, and the manufacturing cost.

$$[Ni\ mass\ \%]+[Cu\ mass\ \%]<0.75 \quad \text{(Expression 2)}$$

Here, [Ni mass %] and [Cu mass %] in Expression 2 respectively represent the Ni content and the Cu content (mass %) in the steel.

Preferable, [Ni mass %]+[Cu mass %]<0.60.

Ni and Cu are optional elements, and thus the lower limit on the left side of Expression 2 does not have to be specified.

In the case of the high strength spring steel, the securing of the hardenability is also an important object. In the spring steel according to the present embodiment, in order to suppress the generation of the corrosion pit, Mn content, which is an element for increasing the hardenability, is limited to 0.60% or less. However, in a case where Cr and B, and Mo, V, Cu, Ni, and the like as necessary are used in combination, the hardenability may be secured. Particularly, since even a small amount of B has a great effect for increasing the hardenability, in the spring steel according to the present embodiment, even when the Cu content and the Ni content are 0.75% or less in total, high strength can be achieved.

In the spring steel according to the present embodiment, the generation of MnS is suppressed by fixing S with Ti. Since MnS becomes a starting point of the corrosion, the generation of MnS is suppressed so that the generation of rusting or a corrosion pit can be suppressed. In order to obtain the sufficient effect for suppressing the rusting or the generation of a corrosion pit, an appearance frequency of MnS is required to be decreased to less than 20% among inclusions having an equivalent circle diameter of 1 μm or more (a percentage of the number of MnS to the number of inclusions having an equivalent circle diameter of 1 μm or more), which is observed in an arbitrary cut section of the steel. It is more preferable that the appearance frequency of MnS is less than 10%. The reason that the observation target is set to inclusions having an equivalent circle diameter of 1 μm or more is because the sulfide-based inclusion generally has an equivalent circle diameter of 1 μm or more. The cut surface of the steel is mirror-polished, 20 or more inclusions are observed with a metallographic microscope (optical microscope), and the appearance frequency of MnS in the inclusions of 1 μm or more is calculated from the number of MnS with respect to the number of observed inclusions. At this point, the observation visual field is set to a ¼ position of a diameter from the surface (position separated from a distance corresponding to ¼ of the diameter of the steel toward the center from the surface of the steel), in order to observe 20 or more inclusions, 10 or more visual fields are observed at observation magnification of 1,000 times, for example, moving in the rolling direction. The determination of whether or not inclusions are MnS may be estimated from the color (MnS is gray, Ti-based sulfide is a color from white to yellow through pink) during observation with a metallographic microscope, but it is preferable that inclusions are verified by EPMA or SEM-EDS.

The spring steel according to the present embodiment is obtained by casting a slab having the chemical composition obtained from Al deoxidized molten steel and hot rolling the slab. For example, the spring steel according to the present embodiment may be obtained by heating a steel ingot having the above chemical composition at a temperature of 950° C. to 1,200° C. for the time not more than 120 min and performing hot rolling by a known method.

The spring steel according to the present embodiment may be subjected to quenching and tempering and then subjected to a spring process so as to form a spring, or may be subjected to hot spring processing so as to form a spring and then subjected to quenching and tempering.

EXAMPLES

Subsequently, examples of the present invention are described. The conditions in the examples are one condition example employed in order to confirm the applicability and the effect of the present invention, and the present invention is not limited to this one condition example. The present invention may employ various conditions as long as the object of the present invention is achieved without departing from the gist of the present invention.

The chemical compositions of each example and comparative example and ([Ti mass %]−3.43×[N mass %])/[S mass %] (in tables (Ti−3.43×N)/S), [Cu mass %]+[Ni mass %] (in tables, Cu+Ni) are provided in Tables 1 and 2. In Tables 1 and 2, the reference symbol "-" represents that the corresponding element is not added. The remainders in Tables 1 and 2 are Fe and impurities.

The steel ingot having the chemical composition shown in Tables 1 and 2 were heated at the temperature of 950° C. to 1200° C. for the time not more than 120 min, so as to perform hot rolling, such that a steel (spring steel) having φ (diameter) of 12 mm to 18 mm.

TABLE 1

| | | Chemical Composition (mass %) | | | | | | | | | | | | | | | | (Ti—3.43N)/S | Cu + Ni |
|---|---|---|---|---|---|---|---|---|---|---|---|---|---|---|---|---|---|---|---|
| | | C | Si | Mn | P | S | Cr | Al | Ti | N | B | Mo | V | Cu | Ni | Nb | | |
| Example | 1 | 0.50 | 1.99 | 0.52 | 0.007 | 0.008 | 0.85 | 0.020 | 0.070 | 0.0032 | 0.0025 | 0.20 | — | — | — | — | 7.4 | — |
| | 2 | 0.56 | 1.50 | 0.31 | 0.005 | 0.009 | 0.30 | 0.025 | 0.095 | 0.0040 | 0.0030 | — | — | 0.20 | 0.25 | — | 9.0 | — |
| | 3 | 0.59 | 1.80 | 0.25 | 0.006 | 0.005 | 0.70 | 0.022 | 0.056 | 0.0030 | 0.0035 | — | — | — | — | — | 9.2 | — |
| | 4 | 0.43 | 2.19 | 0.50 | 0.006 | 0.008 | 0.69 | 0.023 | 0.059 | 0.0034 | 0.0027 | — | 0.19 | 0.10 | 0.15 | — | 9.3 | 0.25 |
| | 5 | 0.49 | 2.40 | 0.30 | 0.012 | 0.010 | 0.18 | 0.030 | 0.061 | 0.0040 | 0.0023 | 0.20 | 0.16 | — | — | — | 4.7 | — |
| | 6 | 0.55 | 1.05 | 0.48 | 0.011 | 0.011 | 0.75 | 0.031 | 0.068 | 0.0032 | 0.0025 | — | — | — | — | — | 5.2 | — |
| | 7 | 0.50 | 1.40 | 0.55 | 0.010 | 0.012 | 0.60 | 0.025 | 0.070 | 0.0035 | 0.0031 | — | 0.22 | — | — | — | 4.8 | — |
| | 8 | 0.50 | 2.00 | 0.19 | 0.011 | 0.010 | 0.75 | 0.021 | 0.070 | 0.0028 | 0.0030 | 0.20 | 0.15 | — | — | — | 6.0 | — |
| | 9 | 0.48 | 1.50 | 0.30 | 0.012 | 0.008 | 0.95 | 0.035 | 0.071 | 0.0027 | 0.0026 | — | — | — | — | — | 7.7 | — |
| | 10 | 0.50 | 2.00 | 0.50 | 0.009 | 0.010 | 0.15 | 0.025 | 0.069 | 0.0035 | 0.0025 | 0.20 | 0.31 | — | — | — | 5.7 | — |
| | 11 | 0.49 | 1.79 | 0.50 | 0.010 | 0.011 | 0.50 | 0.025 | 0.080 | 0.0042 | 0.0024 | 0.75 | — | — | — | — | 6.0 | — |
| | 12 | 0.52 | 1.80 | 0.49 | 0.008 | 0.010 | 0.50 | 0.025 | 0.080 | 0.0045 | 0.0030 | — | 0.78 | — | — | — | 6.5 | — |
| | 13 | 0.49 | 1.79 | 0.50 | 0.010 | 0.011 | 0.50 | 0.025 | 0.080 | 0.0063 | 0.0032 | — | 0.22 | — | — | — | 5.3 | — |
| | 14 | 0.49 | 1.79 | 0.50 | 0.010 | 0.011 | 0.40 | 0.025 | 0.080 | 0.0063 | 0.0051 | — | — | — | — | — | 5.3 | — |
| | 15 | 0.50 | 1.80 | 0.49 | 0.008 | 0.006 | 0.69 | 0.029 | 0.071 | 0.0034 | 0.0026 | — | — | — | 0.41 | — | 9.9 | 0.41 |
| | 16 | 0.51 | 1.79 | 0.49 | 0.008 | 0.005 | 0.71 | 0.022 | 0.049 | 0.0035 | 0.0024 | — | — | 0.40 | 0.19 | — | 7.4 | 0.59 |
| | 17 | 0.50 | 2.00 | 0.30 | 0.006 | 0.007 | 0.85 | 0.028 | 0.069 | 0.0041 | 0.0030 | 0.20 | 0.18 | — | — | 0.07 | 7.9 | — |
| | 18 | 0.51 | 2.21 | 0.34 | 0.009 | 0.008 | 0.75 | 0.023 | 0.055 | 0.0038 | 0.0027 | — | — | — | — | 0.03 | 5.3 | — |

TABLE 2

| | | Chemical Composition (mass %) | | | | | | | | | | | | | | | | (Ti—3.43N)/S | Cu + Ni |
|---|---|---|---|---|---|---|---|---|---|---|---|---|---|---|---|---|---|---|---|
| | | C | Si | Mn | P | S | Cr | Al | Ti | N | B | Mo | V | Cu | Ni | Nb | | |
| Comparative Example | 21 | 0.50 | 1.99 | 0.52 | 0.007 | 0.008 | 0.85 | 0.020 | 0.001 | 0.0032 | 0.0025 | 0.20 | — | — | — | — | −1.2 | — |
| | 22 | 0.52 | 1.50 | 0.31 | 0.005 | 0.009 | 0.30 | 0.025 | 0.020 | 0.0040 | 0.0030 | — | 0.15 | — | — | — | 0.7 | — |
| | 23 | 0.51 | 1.90 | 0.32 | 0.012 | 0.012 | 0.71 | 0.018 | 0.042 | 0.0052 | 0.0025 | — | 0.15 | 0.25 | 0.50 | — | 2.0 | 0.75 |
| | 24 | 0.62 | 1.49 | 0.48 | 0.015 | 0.010 | 0.95 | 0.020 | 0.070 | 0.0045 | 0.0022 | — | — | — | — | — | 5.5 | — |
| | 25 | 0.38 | 2.48 | 0.40 | 0.008 | 0.007 | 0.57 | 0.025 | 0.055 | 0.0025 | 0.0018 | 0.25 | — | — | — | — | 6.6 | — |
| | 26 | 0.50 | 3.15 | 0.31 | 0.005 | 0.012 | 0.70 | 0.024 | 0.070 | 0.0028 | 0.0023 | — | — | — | — | — | 5.0 | — |
| | 27 | 0.55 | 0.50 | 0.52 | 0.008 | 0.015 | 0.70 | 0.001 | 0.021 | 0.0035 | 0.0024 | — | — | — | — | — | 0.6 | — |
| | 28 | 0.52 | 1.60 | 0.85 | 0.012 | 0.009 | 0.75 | 0.001 | 0.065 | 0.0028 | 0.0025 | — | — | — | — | — | 6.2 | — |
| | 29 | 0.52 | 1.50 | 0.51 | 0.025 | 0.015 | 0.50 | 0.021 | 0.070 | 0.0035 | 0.0024 | — | 0.12 | — | — | — | 3.9 | — |
| | 30 | 0.51 | 1.50 | 0.50 | 0.012 | 0.030 | 0.52 | 0.020 | 0.070 | 0.0028 | 0.0025 | — | 0.15 | — | — | — | 2.0 | — |

TABLE 2-continued

| | Chemical Composition (mass %) | | | | | | | | | | | | | | | | Cu + |
|---|---|---|---|---|---|---|---|---|---|---|---|---|---|---|---|---|---|
| | C | Si | Mn | P | S | Cr | Al | Ti | N | B | Mo | V | Cu | Ni | Nb | (Ti—3.43N)/S | Ni |
| 31 | 0.54 | 1.80 | 0.30 | 0.009 | 0.010 | 1.21 | 0.020 | 0.062 | 0.0042 | 0.0019 | — | 0.10 | — | — | — | 4.8 | — |
| 32 | 0.54 | 1.75 | 0.41 | 0.008 | 0.010 | 0.81 | 0.035 | 0.062 | 0.0042 | 0.0029 | 1.21 | — | — | — | — | 4.8 | — |
| 33 | 0.50 | 1.51 | 0.30 | 0.005 | 0.005 | 0.50 | 0.025 | 0.042 | 0.0029 | 0.0020 | — | 1.50 | — | — | — | 6.4 | — |
| 34 | 0.50 | 1.78 | 0.29 | 0.007 | 0.012 | 0.32 | 0.085 | 0.072 | 0.0042 | 0.0030 | — | — | — | — | — | 4.8 | — |
| 35 | 0.51 | 1.80 | 0.49 | 0.009 | 0.007 | 0.50 | 0.025 | 0.151 | 0.0051 | 0.0025 | 0.15 | 0.20 | — | — | — | 19.1 | — |
| 36 | 0.49 | 2.15 | 0.51 | 0.006 | 0.008 | 0.29 | 0.023 | 0.042 | 0.0092 | 0.0033 | — | — | — | — | — | 1.3 | — |
| 37 | 0.50 | 2.13 | 0.49 | 0.005 | 0.005 | 0.33 | 0.022 | 0.063 | 0.0042 | — | — | — | — | — | — | 9.7 | — |
| 38 | 0.52 | 2.20 | 0.51 | 0.008 | 0.006 | 0.70 | 0.001 | 0.045 | 0.0052 | 0.0025 | — | — | — | — | — | 4.6 | — |
| 39 | 0.51 | 1.80 | 0.50 | 0.007 | 0.012 | 0.71 | 0.024 | 0.042 | 0.0068 | 0.0028 | — | — | — | — | — | 1.6 | — |

With respect to the obtained spring steel, properties after quenching and tempering were evaluated, and thus a step of heating at the temperature of 900° C. to 1,050° C. and quenching, and a step of tempering such that the tensile strength was 1,900 MPa to 2,000 MPa were performed. The tempering condition was determined by tempering at 300° C., 400° C., and 500° C. as a preliminary test, measuring the strength, and estimating the tempering temperature at which the predetermined strength was obtained.

A test piece was obtained from the obtained steel after quenching and tempering, and a tensile test, a charpy impact test, observation of inclusions, and the constant temperature and constant humidity test were performed.

<Tensile test>

A tensile test was performed by manufacturing a test piece having a parallel portion diameter of 8 mm in conformity with No.14 test piece of "JIS Z 2241". In a case where the tensile strength was 1,800 MPa or more, it was determined that sufficient strength was able to be obtained.

<Charpy Impact Test>

A charpy impact test is performed at room temperature (23° C.) by manufacturing a U-notched test piece (notch lower height of 8 mm and a width of 5 mm sub size) in conformity with "JIS Z 2242". In a case where the impact value (absorbed energy) was 70.0 J/cm$^2$ or more, it was determined that sufficient toughness was able to be obtained.

<Observation of Inclusion>

The steel was cut in parallel to the rolling direction, the cut surface was mirror-polished, 20 or more inclusions having an equivalent circle diameter of 1 μm or more were observed with a metallographic microscope, and the appearance frequency of MnS in the inclusions having an equivalent circle diameter of 1 μm or more was calculated from the number of MnS with respect to the number of observed inclusions. At this point, the observation visual field was set to the ¼ position of the diameter, and 10 or more visual fields were observed at observation magnification of 1,000 times while moving in the rolling direction. The determination of MnS was estimated from the color (MnS is gray and Ti-based sulfide is a color from white to yellow through pink) during observation with the metallographic microscope and was confirmed by EPMA or SEM-EDS. An appearance frequency of MnS of less than 20% was accepted.

<Constant Temperature and Constant Humidity Test>

The test piece was exposed to the constant temperature and constant humidity (temperature of 35° C. and humidity of 95%) for one week, and whether rusting was generated was visually observed. In a case where rusting was not generated, it was determined that corrosion resistance was excellent.

In the examples and the comparative examples, the mechanical properties (tensile strength and impact value), MnS appearance frequency in the inclusion, and whether the rusting was generated or not generated after the constant temperature and constant humidity test (temperature of 35° C. and humidity of 95%) for one week are shown in Tables 3 and 4.

TABLE 3

| | | Tensile strength MPa | Impact value J/cm$^2$ | MnS appearance frequency | Rusting generated or not generated after constant temperature and constant humidity test |
|---|---|---|---|---|---|
| Example | 1 | 1933 | 81.1 | 5% | Not generated |
| | 2 | 1928 | 70.3 | 5% | Not generated |
| | 3 | 1942 | 82.5 | 5% | Not generated |
| | 4 | 1935 | 79.3 | 5% | Not generated |
| | 5 | 1946 | 82.5 | 10% | Not generated |
| | 6 | 1937 | 82.4 | 5% | Not generated |
| | 7 | 1927 | 70.3 | 10% | Not generated |
| | 8 | 1940 | 87.5 | 0% | Not generated |
| | 9 | 1942 | 92.1 | 5% | Not generated |
| | 10 | 1972 | 77.7 | 5% | Not generated |
| | 11 | 1964 | 82.7 | 5% | Not generated |
| | 12 | 1902 | 72.3 | 5% | Not generated |
| | 13 | 1915 | 70.3 | 10% | Not generated |
| | 14 | 1931 | 87.5 | 5% | Not generated |
| | 15 | 1920 | 81.4 | 5% | Not generated |
| | 16 | 1932 | 83.2 | 10% | Not generated |
| | 17 | 1965 | 75.9 | 5% | Not generated |
| | 18 | 1948 | 72.4 | 15% | Not generated |

TABLE 4

| | | Tensile strength MPa | Impact value J/cm$^2$ | MnS appearance frequency | Rusting generated or not generated after constant temperature and constant humidity test |
|---|---|---|---|---|---|
| Comparative Example | 21 | 1992 | 81.1 | 95% | Generated |
| | 22 | 1925 | 70.3 | 95% | Generated |
| | 23 | 1952 | 75.2 | 65% | Generated |
| | 24 | 1944 | 48.7 | 5% | Not generated |
| | 25 | 1932 | 37.9 | 10% | Not generated |
| | 26 | 1944 | 62.3 | 5% | Not generated |
| | 27 | 1936 | 42.1 | 90% | Generated |
| | 28 | 1966 | 55.5 | 30% | Not generated |
| | 29 | 1932 | 27.1 | 10% | Not generated |
| | 30 | 1924 | 16.3 | 35% | Generated |
| | 31 | 1954 | 62.1 | 10% | Not generated |
| | 32 | 1945 | 52.4 | 10% | Not generated |
| | 33 | 1954 | 40.3 | 5% | Not generated |
| | 34 | 1912 | 28.3 | 5% | Not generated |
| | 35 | 1925 | 48.7 | 0% | Not generated |
| | 36 | 1934 | 72.3 | 90% | Generated |

TABLE 4-continued

|  | Tensile strength MPa | Impact value J/cm² | MnS appearance frequency | Rusting generated or not generated after constant temperature and constant humidity test |
|---|---|---|---|---|
| 37 | 1965 | 52.8 | 5% | Not generated |
| 38 | 1927 | 72.4 | 30% | Generated |
| 39 | 1950 | 64.2 | 55% | Generated |

All examples had the tensile strength of 1,900 MPa to 2,000 MPa and an impact value of 70.0 J/cm² or more and thus exhibited the compatibility between the strength and the toughness at a high level. In all examples, the appearance frequency of MnS was less than 20% and rusting in the constant temperature and constant humidity test was not recognized.

On the other hand, in Comparative Examples 24, 25, 26, 27, 28, 29, 30, 31, 32, 33, 34, 35, 37, and 39, the C content, the Si content, the Mn content, the P content, the S content, the Cr content, the Mo content, the V content, the Al content, the Ti content, the B content, and ([Ti mass %]−3.43×[N mass %])/[S mass %] were excessive or deficient, and as a result, the steel was embrittled or the structure became coarse, such that the impact value was decreased.

Since, in Comparative Examples 21, 22, and 27, Ti was deficient, in Comparative Examples 23 and 39, ([Ti mass %]−3.43×[N mass %])/[S mass %] was deficient, in Comparative Example 30, S was excessive, in Comparative Example 36, N was excessive, and in Comparative Example 38, Al was deficient, corrosion resistance was decreased, and thus the rusting was recognized.

Industrial Applicability

The prior austenite grain after quenching and tempering is refined, and thus the spring steel according to the present invention has excellent mechanical properties after quenching and tempering. Therefore, according to the present invention, it is possible to obtain the spring steel in which the impact value having the high strength of 1,800 MPa or more is secured, and further in which corrosion resistance is also high.

The invention claimed is:

1. A spring steel comprising, as a chemical composition, by mass %:
C: 0.40% to 0.60%;
Si: 0.90% to 3.00%;
Mn: 0.10% to 0.60%;
Cr: 0.10% to 1.00%;
Al: 0.010% or more and less than 0.050%;
Ti: 0.040% to 0.100%;
B: 0.0010% to 0.0060%;
N: 0.0010% to 0.0070%;
V: 0% to 1.00%;
Mo: 0% to 1.00%;
Ni: 0% or more and less than 0.45%;
Cu: 0% to 0.50%;
Nb: 0% to 0.10%;
P: limited to less than 0.020%;
S: limited to less than 0.020%; and
a remainder including Fe and impurities,
wherein Expressions 1 and 2 are satisfied, and
an appearance frequency of MnS is less than 20%, wherein said appearance frequency is defined as a number of MnS inclusions observed at a ¼ position of a diameter from a surface divided by a number of total inclusions having an equivalent circle diameter of 1 μm or more observed at said ¼ position of a diameter from a surface, expressed as a percentage, ([Ti mass %]−3.43×[N mass %])/[S mass %]>4.0    Expression 1

[Ni mass %]+[Cu mass %]<0.75    Expression 2 here, [Ni mass %], [Cu mass %], [Ti mass %], [N mass %], and [S mass %] in Expressions 1 and 2 respectively represent a Ni content, a Cu content, a Ti content, a N content, and a S content in unit mass%, and when the spring steel is heated at temperature of 900° C. to 1,050° C. and quenched, and then is tempered such that the tensile strength is 1900 MPa to 2000 MPa, the impact value is 70.0 J/cm² or more.

2. The spring steel according to claim 1 comprising, as the chemical composition, by mass%, one or more selected from the group consisting of:
V: 0.05% to 1.00%;
Mo: 0.10% to 1.00%;
Ni: 0.05% or more and less than 0.45%;
Cu: 0.05% to 0.50%; and
Nb: 0.01% to 0.10%.

3. The spring steel according to claim 1, comprising, as the chemical composition, by mass %, Si: 0.9 to 2.5%.

* * * * *